(12) United States Patent
Gigas et al.

(10) Patent No.: US 7,056,095 B1
(45) Date of Patent: Jun. 6, 2006

(54) IMPELLER AND METHOD USING SOLID FREE FORM FABRICATION

(75) Inventors: Bernd Gigas, Churchville, NY (US); Steve Hale, Rochester, NY (US)

(73) Assignee: SPX Corporation, Charlotte, NC (US)

( * ) Notice: Subject to any disclaimer, the term of this patent is extended or adjusted under 35 U.S.C. 154(b) by 16 days.

(21) Appl. No.: 10/874,177

(22) Filed: Jun. 24, 2004

Related U.S. Application Data

(63) Continuation of application No. 10/288,469, filed on Nov. 6, 2002, now Pat. No. 6,796,770.

(51) Int. Cl.
  *F01D 5/14* (2006.01)
(52) U.S. Cl. .............. 416/229 R; 416/226; 416/241 R; 29/889
(58) Field of Classification Search ................ 416/226, 416/299 R, 241 R; 29/889, 889.21, 889.7, 29/889.71, 889.722
  See application file for complete search history.

(56) References Cited

U.S. PATENT DOCUMENTS

| | | | | |
|---|---|---|---|---|
| 2,641,439 A | * | 6/1953 | Williams | 416/90 R |
| 2,659,444 A | | 11/1953 | Stanley | 170/159 |
| 3,799,701 A | | 3/1974 | Rothman | 416/226 |
| 4,040,159 A | * | 8/1977 | Darrow et al. | 29/889.721 |
| 4,122,673 A | | 10/1978 | Leins | 60/274 |
| 4,137,619 A | | 2/1979 | Beltran et al. | 29/156.8 H |
| 4,739,954 A | | 4/1988 | Hamilton | 244/123 |
| 4,789,304 A | | 12/1988 | Gustafson et al. | 416/95 |
| 5,204,055 A | | 4/1993 | Sachs et al. | 419/2 |
| 5,490,962 A | | 2/1996 | Cima et al. | 264/22 |
| 5,672,261 A | * | 9/1997 | Wheat et al. | 29/889.72 |
| 5,891,513 A | | 4/1999 | Dubin et al. | 427/98 |
| 6,129,872 A | | 10/2000 | Jang | 264/75 |
| 6,180,049 B1 | | 1/2001 | Jang et al. | 264/401 |
| 6,629,559 B1 | * | 10/2003 | Sachs et al. | 164/361 |
| 6,676,892 B1 | | 1/2004 | Das et al. | 419/7 |
| 6,811,744 B1 | * | 11/2004 | Keicher et al. | 419/5 |

OTHER PUBLICATIONS

Sachs et al., "CAD-Casting: Direct Fabrication of Ceramic Shells and Cores by Three Dimensional Printing", Manufacturing Review, vol. 5, No. 2, Jun. 1992, pp. 117-126.

The Polymer Handbook, 3rd edition, Wiley, N. Y. 1989, Section IV, Physical Data of Oligomers, pp. IV/1-IV99.

Chapter 31 of Modern Electroplating, F. Lowenheim, 3rd edition.

* cited by examiner

*Primary Examiner*—Igor Kershteyn
(74) *Attorney, Agent, or Firm*—Baker & Hostetler LLP

(57) ABSTRACT

The present invention relates to the use of solid freeform fabrication (SFF) technology in the manufacture of impeller blades. The impeller blades may be metal plated and further incorporated onto a rigid skeletal frame to allow for more desirable wear resistance and strength.

21 Claims, 4 Drawing Sheets

IMPELLER AND METHOD USING SOLID FREE FORM FABRICATION

This application is a continuation application, and claims the benefit of U.S. patent application Ser. No. 10/288,469, filed Nov. 6, 2002 now U.S. Pat. No. 6,796,770, entitled IMPELLER AND METHOD USING SOLID FREE FORM, the disclosure of which is incorporated herein by reference.

FIELD OF THE INVENTION

The present invention relates generally to the field of impeller design and manufacture.

BACKGROUND OF THE INVENTION

A number of approaches have been proposed in the manufacture of impellers. In most cases, the manufacture is achieved through the formation of the desired shape(s) from plate substrate, for example formed sheet metal. A primary problem with this prior art approach is that, in many circumstances, it is difficult or impractical to use preferred durable materials, such as certain metals, to achieve the configuration desired. In order to obtain a hydrofoil impeller design, for example, the thickness of the impeller blade must vary along the mean chamber line from the leading edge of the impeller to the trailing edge. The shape and tortuosity can dramatically affect impeller performance, but are difficult to control using standard processing techniques.

Generally, shortcomings of the prior art arise from (1) difficulties in maintaining uniformity in mass production and (2) lack of adequate dimensional accuracy in complex patterns for use in current impeller technology. Additionally, modifying the shape of an impeller blade to achieve better impeller performance has many costs associated with the design, testing, and tooling required to arrive at the desired blade configuration. Thus, there is a need for an improved method for impeller design and manufacture.

With the increased use of Computer Aided Design (CAD) solid modeling systems, a new technique of manufacturing technology has emerged that enables translation of the CAD output data into a three-dimensional (3-D) physical object. This technology is commonly referred to as solid free form fabrication (SFF) or layer manufacturing, which entails building an object on a layer-by-layer and point-by-point basis. CAD with SFF technologies allow for greater repeatability which allows for high quality mass production of the object. Forming objects automatically in three dimensions is useful in verifying a CAD database, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, and providing small production runs.

On the other hand, the resin materials that are currently available for SFF are also subject to certain manufacturing and process limitations in structural stability and rigidity, in chemical resistance and abrasion, and in manufacturing cost.

Accordingly, the need exits for a cost effective solution to increasing impeller performance without the significant investment required for reconfiguring and tooling a new impeller blade. The present invention fulfills these and other needs, and overcomes the drawbacks of the prior art, at least to some extent.

SUMMARY OF THE INVENTION

It is therefore a feature and advantage of the present invention to provide methods and compositions for designing and fabricating impellers with a desired degree of improved dynamics, dimensional accuracy and stability, and corrosion and erosion characteristics.

The above and other features and advantages are achieved, in one aspect, through the use of novel impeller design and construction methods using preferably coupled with CAD software, computer-controlled SFF techniques, to manufacture at least a portion of an impeller blade. This approach allows impeller devices to be produced with high precision and optimum shape for the required process.

It is a still further aspect of the present invention to provide methods for imparting structural strength to the impeller apparatus and blades, preferably, by providing a metal skeleton to fit the interior of the blade.

It is yet another aspect of the instant invention to provide a method for the production of resin impellers that have desirable chemical and abrasion resistance characteristics and rigidity. Preferably, the entire resin-constructed impeller is electroless plated with a ductile material such as copper or nickel, followed by electrolytic plating of a metal such as nickel, cadmium, or chrome to provide hardness, and chemical and abrasion resistance.

It is still a further aspect of the present invention to provide an impeller comprising at least one blade having at least one blade segment fabricated using any one of a solid free form manufacturing technique. The blade preferably has an exterior surface and a skeletal support structure disposed inside the blade to support the blade.

It is still a further aspect of the present invention to provide an impeller comprising at least one blade having at least one blade segment fabricated using any one of a solid free form manufacturing technique.

It is still a further aspect of the present invention to provide an impeller blade having an exterior surface, comprising a metal-plated layer at least partially covering the exterior surface of the blade.

It is still a further aspect of the present invention to provide an impeller, comprising at least one blade having at least one blade segment fabricated using any one of a solid free form manufacture technique, said blade having an exterior surface and a metal-plated layer at least partially covering the exterior surface of the blade.

It is still a further aspect of the present invention to provide a method for making an impeller blade comprising the step of forming a matrix of sequential layers of polymer material using a solid free-form fabrication technique.

It is still a further aspect of the present invention to provide a method of manufacturing an impeller, comprising forming a matrix of sequential layers of polymer material using a solid free-form fabrication technique to form at least one blade segment having an exterior surface and metal-plating the exterior surface.

It is still a further aspect of the present invention to provide a method of manufacturing an impeller, comprising forming a matrix of sequential layers of polymer material using a solid free-form fabrication technique to form at least one blade segment having an exterior surface, and disposing a skeletal support structure with the blade segment.

It is still a further aspect of the present invention to provide an impeller comprising at least one blade segment fabricated using and one of a solid free form manufacture technique, and a means for providing supplemental structural support to said blade.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

The present invention relates to some preferred embodiments to the use of computer aided design (CAD) in combination with solid freeform fabrication (SFF) technology and metal plating that allows for the manufacture of impeller blades having desirable hydrofoil shapes with suitable chemical and abrasion resistance characteristics.

Assembly

Figure 1:
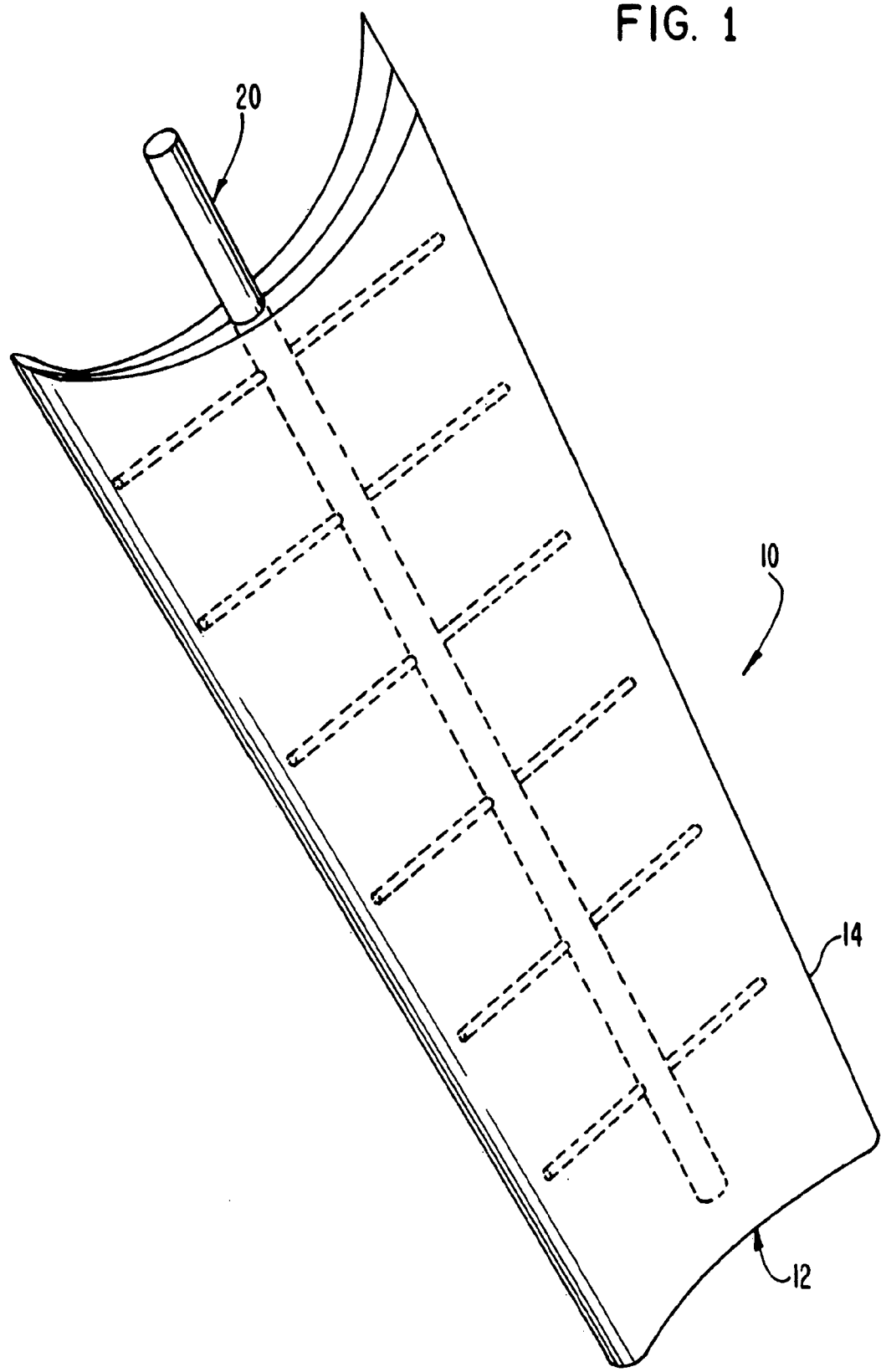
FIG. 1 is a perspective view illustrating a complete impeller blade with a rigid interior skeleton sandwiched between two blade segments.
Figure 2:
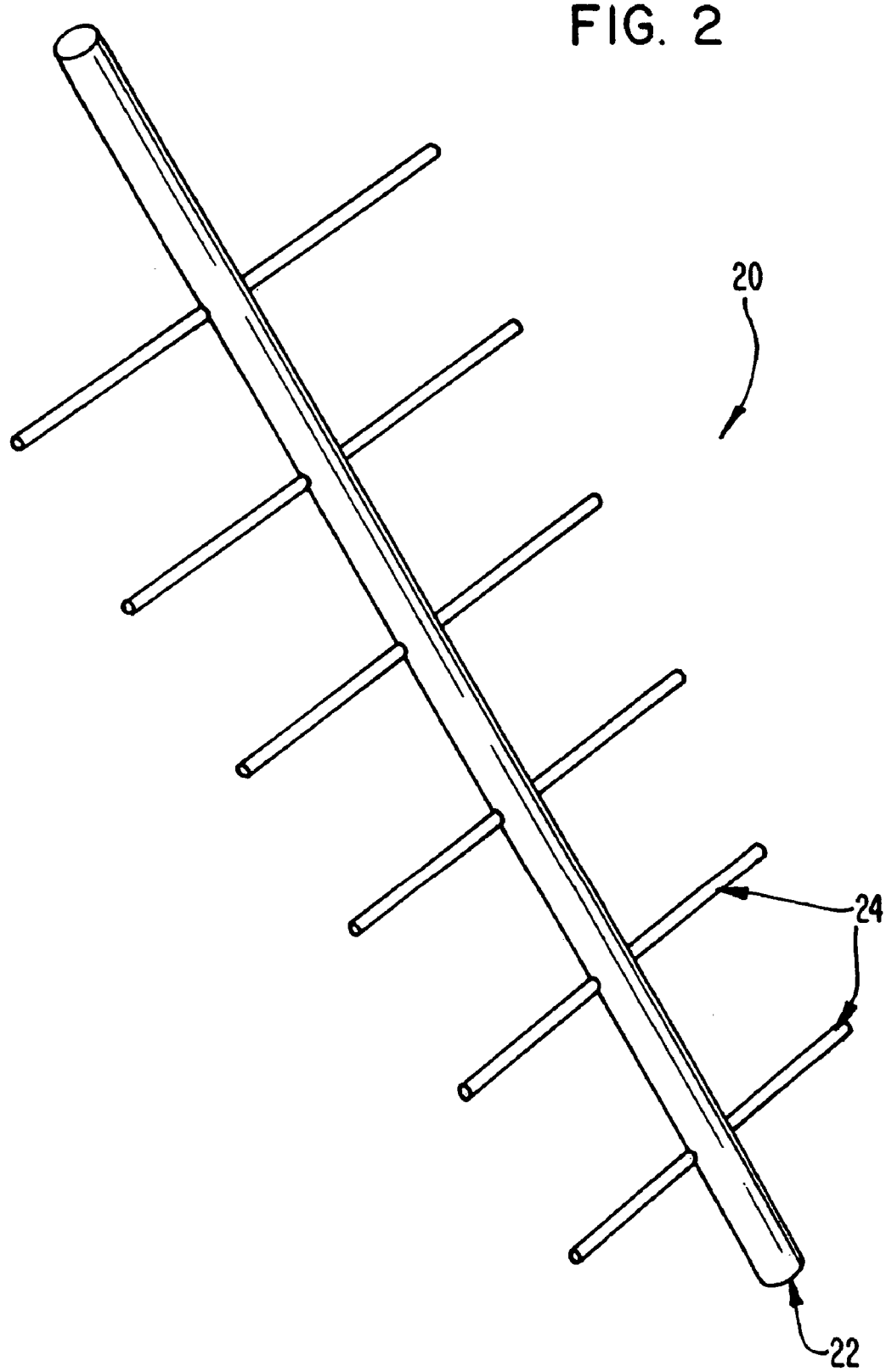
FIG. 2 is a perspective view illustrating several elements of the rigid skeletal structure of one preferred embodiment of the present invention.
Figure 3:
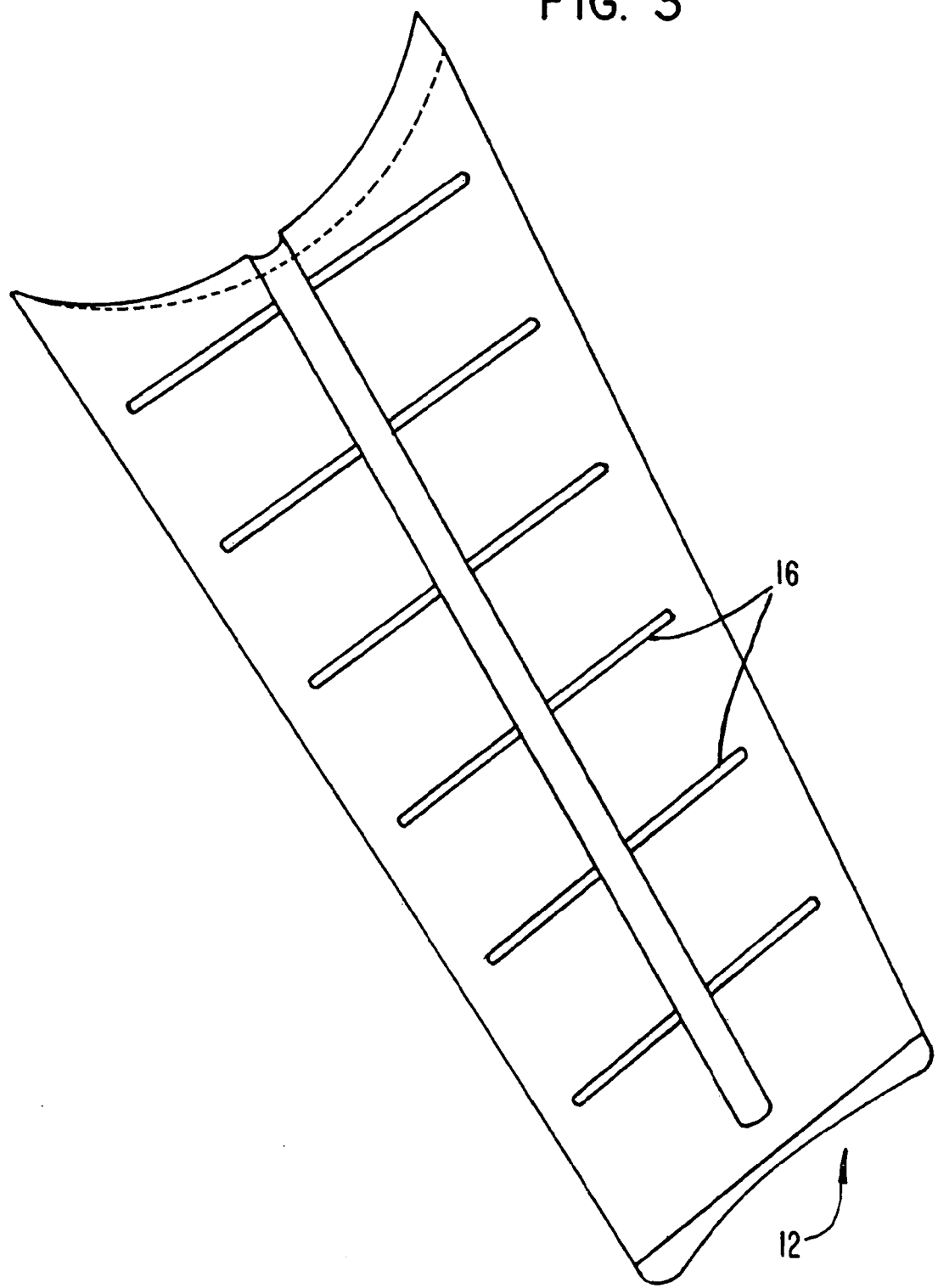
FIG. 3 is a perspective view illustrating one longitudinal segment of an impeller blade design of a preferred embodiment of the present invention.
Figure 4:
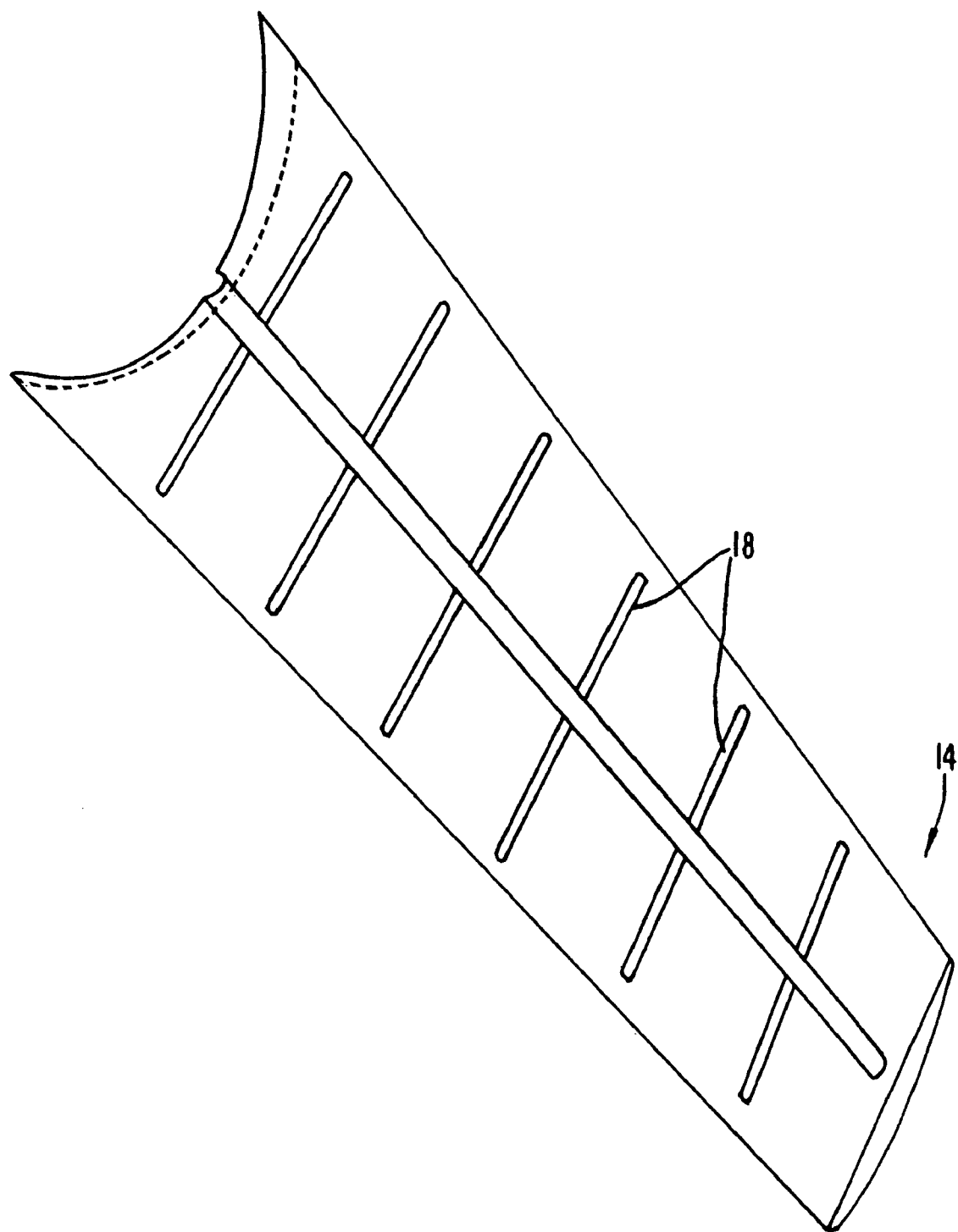
FIG. 4 is another perspective view illustrating the other longitudinal segment of an impeller blade design of a preferred embodiment of the present invention.

As an example of assembling an impeller 10, as shown in FIG. 1, two impeller halves 12, 14 are modeled by CAD into shapes such as shown in FIGS. 3 and 4. Each half 12, 14 can be designed to be shaped suitably for desired performance for its purpose. Each half 12, 14 includes a housing shaped to accept a rigid skeleton 20 to be inserted into the completed impeller blade. The two halves 12, 14 are then physically generated through SFF techniques. Each half 12, 14 is then mated onto a rigid skeleton 20 such as shown in FIG. 2 such that the skeleton 20 fits into the respective housing 16, 18. The two halves 12, 14 sandwiching the rigid skeleton 20 are subsequently fastened to each other by chemical bonding methods such as glue or by the use of hardware, with or without covering metal plates, to sandwich and trap the skeleton 20. The glue or hardware can also directly fix the skeleton 20 in the housings 16, 18 or the skeleton 20 can simply reside in the housings 16, 18, trapped by its fit therein. To complete the impeller blade 10 shown in FIG. 1, the preferred method is then to electroless plate a ductile material such as copper onto the entire surface of the impeller, followed by electrolytic plating of a metal such as nickel to provide hardness and chemical resistance. The end result of the process is thus a structurally strong impeller blade 10 of desirable shape and suitable chemical and abrasion resistance.

Incorporation of Structural Elements:

The application of e.g. SSF may sometimes use materials which lack sufficient mechanical rigidity required in impellers and impeller blades. Therefore, in a preferred embodiment, supplemental structural strength is provided by the metal tree-like skeletal structure 20 interior to the impeller 10 as depicted in FIGS. 1 and 2. By way of example, a single or plurality of metal rods 22 will extend axially from the proximal end (hub) to the distal end of the impeller blade. In addition, several metal rods 24, appropriately positioned perpendicular to the central rod 22 may also be used for additional stability. As depicted in FIGS. 3 and 4, the housings 16, 18 for the skeleton 20 will be designed into either half 12, 14 of the impeller blade so as to securely fasten the skeleton 20 in between two halves 12, 14 of an impeller blade. A completed impeller blade 10 is shown in FIG. 1. Though a metallic structure is preferred for the skeleton 20, one skilled in the art will recognize that any rigid material with adequate stiffness would be suitable, including wood, plastics, and other composite material. In addition, the architecture of the metal skeleton frame 20 in FIG. 2 is only by way of example. The number and positioning of the metal rods 22, 24 are exemplary and other designs can be employed.

A preferred embodiment of the present invention utilizes the use of resin material processing capabilities such as SSF that allow for the manufacture of an optimized hydrofoil shape. A model of the object, in this instance an impeller, to be manufactured forms the basis of the manufacturing process. The model consists of descriptors that define features of an object that is to be manufactured. These descriptors may relate to features of the object such as shape and/or pattern. Alternatively, and preferably, the model may be in an electronic form. The electronic model is preferably formed with CAD tools.

The electronic CAD model reflects a desired outcome of a manufacturing process. For example, the model will preferably provide shape and size related information to a manufacturing process such as SSF layered manufacturing. Alternatively, or in addition, models may provide information relating to color, material structure, or finish. The model is then used to create a series of control signals for a process or, alternatively, for each of several processes. This transformation occurs in the absence of any feedback from the manufacturing process. The use of computer integrated manufacturing allows for automation in the transition from model to repeatable manufacturing process.

The impeller blades are realized by a process and related apparatus for fabricating a 3-D object on a layer-by-layer basis, also known as SFF. The steps are executed under the control of the CAD computer by taking the following steps: (1) creating a geometry of the three-dimensional object on a computer with the geometry including a plurality of segments defining the object; (2) generating programmed signals corresponding to each of the segments in a predetermined sequence; and (3) moving the deposition sub-system and the target surface relative to each other in response to the programmed signals. To build a multi-material object, these procedures are then repeated under the control of the CAD computer to deposit consecutive layers in sequence, with each subsequent layer adhering to a preceding layer, thereby forming the desired multiple-layer 3-D object.

The target surface may be provided with a controlled atmosphere wherein the temperature, pressure (including vacuum conditions), and gas composition can be regulated to facilitate deposition and to protect against possible metal oxidation. Preferably, one or more sensors are provided to periodically measure the dimensions of an object being built and send the acquired dimension data to the CAD computer so that new sets of logical layers may be re-calculated when necessary.

CAD with SFF technologies allow for greater repeatability which allows for high quality mass production of the object. A series of determined control signals control the manufacturing process to produce an object. This repeatability allows for high quality mass production of the object by repeatedly applying the series of control signals to the manufacturing process. For example, control signals may control laser spot, size, location, orientation, depth of penetration, and speed of a laser beam. In this manner, complex impeller shapes can be produced. Examples of useful SFF processes include:

Three Dimensional Printing (3DP)

3DP is described by Sachs, et al., "CAD-Casting: Direct Fabrication of Ceramic Shells and Cores by Three Dimensional Printing" Manufacturing Review 5 (2), 117–126 (1992) and U.S. Pat. No. 5,204,055 to Sachs, et al., the disclosures of which are hereby incorporated by reference. 3DP is used to create a solid object by ink-jet printing a binder into selected areas of sequentially deposited layers of powder. Each layer is created by spreading a thin layer of powder over the surface of a powder bed. The powder bed is supported by a piston which descends upon powder spreading and printing of each layer (or, conversely, the ink jets and spreader are raised after printing of each layer and the bed remains stationary). Instructions for each layer are derived directly from a CAD representation of the component. The area to be printed is obtained by computing the area of intersection between the desired plane and the CAD representation of the object. Both raster and vector apparatuses can be used. A raster apparatus is where the print-head goes back and forth across the bed with the jet turning on and off. This is sometimes unsuitable where the material is likely to clog the jet upon settling. A vector apparatus is similar to an x-y printer. Although potentially slower, the vector printer may yield a more uniform finish. The individual sliced segments or layers are joined to form the three dimensional structure. The powder/binder layer forming process is repeated so as to build up the device layer by layer. While the layers become hardened or at least partially hardened as each of the layers is laid down, once the desired final part configuration is achieved and the layering process is complete, in some applications it may be desirable that the form and its contents be heated or cured at a suitably selected temperature to further promote binding of the powder particles. In either case, whether or not further curing is required, the loose, unbonded powder particles are removed using a suitable technique, such as ultrasonic cleaning, to leave a finished device.

Finer feature size is also achieved by printing polymer solutions rather than pure solvents. For example, a 10 wt. % PLC solution in chloroform produces 200 μm lines under the same conditions as above. The higher solution viscosity slows the migration of solvent away from the center of the primitive.

The solvent drying rate is an important variable in the production of polymer parts by 3DP. Very rapid drying of the solvent tends to cause warping of the printed component. Much, if not all, of the warping can be eliminated by choosing a solvent with a low vapor pressure. Thus, PLC parts prepared by printing chloroform have nearly undetectable amounts of warpage, while large parts made with methylene chloride exhibit significant warpage. It has been found that it is often convenient to combine solvents to achieve minimal warping and adequate bonding between the particles. Thus, an aggressive solvent can be mixed in small proportions with a solvent with lower vapor pressure.

Stereo-Lithography (SLA) and Selective Laser Sintering (SLS)

SFF methods are particularly useful for their ability to control composition and microstructure on a small scale for the construction of 3-D devices. The SFF methods, in addition to 3DP, that can also be utilized as described herein including, e.s. stereo-lithography (SLA), selective laser sintering (SLS), ballistic particle manufacturing (BPM), and fusion deposition modeling (FDM).

SLA employs software to first convert a CAD generated file into SLA (.STL) format. The solid model is then further "sliced" into a large number of thin layers with the contours of each layer being defined by a plurality of line segments connected to form vectors or polylines. The layer data are converted to tool path data normally in terms of computer numerical control (CNC) codes such as G-codes and M-codes. These codes are then utilized to drive a fabrication tool for building an object layer by layer. The cross sections are physically created by an ultraviolet (UV) focused laser which is vector scanned over the top of a bath of a photo-polymerizable liquid polymer material. The UV laser causes the bath to polymerize where the laser beam strikes the surface of the bath, resulting in the creation of a first solid plastic layer at and just below the surface. The solid layer is then lowered into the bath by a supporting platform and the laser generated polymerization process is repeated for the generation of the next layer, and so on, until a plurality of superimposed layers all the constituent layers of the object are obtained. After fabrication, subsequent steps are typically required to drain the unused resin and to fully cure all of the photopolymer that may be trapped within the partially cured material.

SLS also uses a focused laser beam, but to sinter areas of a loosely compacted plastic powder, the powder being applied layer by layer. In this method, a thin layer of powder is spread evenly onto a flat surface with a roller mechanism. The powder is then raster-scanned with a high-power laser beam. The powder material that is struck by the laser beam is fused, while the other areas of powder remain dissociated. Successive layers of powder are deposited and raster-scanned, one on top of another, until an entire part is complete. Each layer is sintered deeply enough to bond it to the preceding layer.

SLA and SLS are similar in that matter is laminated to make three dimensional shapes. The two dimensional profile of each laminate is specified by different methods in the two techniques. Selective photopolymerization of a thin layer of polymer precursor is performed during SLA to define the shape of each layer and bond the layer to previous layers. SLS selectively sinters layers of powder using a laser to define the shape of each layer and to bond to the previous layer. Use of these methods to control composition is limited to one dimensional control since one can only vary the composition of each layer. Nonetheless, these methods can be useful for construction of impeller devices where one dimensional compositional control is all that is desired.

Ballistic Particle Manufacturing (BPM) and Fusion Deposition Modeling (FDM)

BPM uses an ink-jet printing apparatus wherein an ink-jet stream of liquid polymer or polymer composite material is used to generate 3-D objects under computer control, similar to the way an ink-jet printer produces two-dimensional graphic printing. The device is formed by printing successive cross-sections, one layer after another, to a target using a cold welding or rapid solidification technique, which causes bonding between the particles and the successive layers.

For FDM, one would use an x-y plotter with a z motion to position an extrudable filament formed of a polymeric material, rendered fluid by heat or the presence of a solvent.

BPM, FDM, and 3DP are related in the sense that all three approaches deposit matter in small areas. Thus, they offer the advantage that local composition can be specified and constructed for any desired three dimensional profile. The composition control is only limited by the resolution of the particular apparatus used for construction. FDM builds structures by extruding a fine filament of plastically deformable material through a small nozzle. The nozzle is directed over the built surface by appropriate x, y and z motion control so as to yield the desired three dimensional structure. Similarly, BPM involves motion control of an ink jet print head to deposit matter in the form of small droplets. Appropriate control of where the droplets are printed permits the construction of a desired three dimensional shape. 3DP uses two sources of material: the material that makes up the porous layer and the material that is printed.

Local composition control using FDM and BPM requires the application of multiple printing or extrusion tools. A similar approach can be followed with 3DP by using multiple print-heads. Alternatively, multiple droplets may be printed into the same location when using 3DP to increase the local composition of the species contained in the printed solution.

Selection of Polymers

Depending on the processing method, the polymer forming the matrix may be in solution, as in the case of SLA, or in particle form, as in the case of SLS, BPM, FDM, and 3DP. In the first method, the polymer must be photopolymerizable. In the latter methods, the polymer is preferably in particulate form and is solidified by application of heat, solvent, or binder (adhesive). In the case of SLS and FDM, it is preferable to select polymers having relatively low melting points.

In the case of 3DP, a polymeric material is applied to a solid platform on a movable piston for solidification and/or incorporation of bioactive agent. A roller evenly spreads the particles over the platform bed. Solvent and/or binder and bioactive agent is then selectively printed onto the polymer particles. After each layer is "printed", the piston lowers the polymeric material so that the process can be repeated to form the next layer.

The particles can be of any shape, including fibrous or rod shaped, although a more spherical particle will typically flow more smoothly. The particles are preferably in the range of ten microns or greater in diameter, although smaller particles can be used if spread in a liquid medium and allowed to dry in between printings.

Unless otherwise specified, the term "polymer" is used to include any of the materials used to form the impeller, including polymers and monomers which can be polymerized or adhered to form an integral unit. In a preferred embodiment the particles are formed of a polymer, such as a synthetic thermoplastic polymer, for example, ethylene vinyl acetate, poly(anhydrides), polyorthoesters, polymers of lactic acid and glycolic acid and other a hydroxy acids, and polyphosphazenes. The polymer can be non-biodegradable or biodegradable. Non-polymeric materials can also be used to form the matrix and are included within the term "polymer" unless otherwise specified. Examples include organic and inorganic materials such as hydoxyapatite, calcium carbonate, and buffering agents.

Other suitable polymers can be obtained by reference to The Polymer Handbook, $3^{rd}$ edition (Wiley, N.Y. 1989) pages IV/1–IV/99, the disclosure of which is herein incorporated by reference.

Selection of Binder

Solvents and/or binders are used in the preferred method, SLA, as well as 3DP and BPM.

The binder can be a solvent for the polymer and/or bioactive agent or an adhesive which binds the polymer particles. Solvents for most of the thermoplastic polymers are known, for example, methylene chloride or other organic solvents.

The binder can be the same material as is used in conventional powder processing methods or may be designed to ultimately yield the same binder through chemical or physical changes that take place in the powder bed after printing, for example, as a result of heating, photopolymerization, or catalysis. Aggressive solvents tend to nearly dissolve the particles and reprecipitate dense polymer upon drying. The time for drying is primarily determined by the vapor pressure of the solvent. There is a range from one extreme over which the polymer is very soluble, for example, 30 weight percent solubility, which allows the polymer to dissolve very quickly, during the time required to print one layer, as compared with lower solubilities. The degree to which the particles are attacked depends on the particle size and the solubility of the polymer in the solvent. Fine powder is more completely dissolved than powder with larger particle size.

Control of Chemical Erosion and Abrasion

At this time, SLA applies to only a limited number of materials with limited chemical and abrasion resistance. Until such a time as other, more resilient materials are available, in some circumstances an additional processing step may be desirable to complete a functional impeller. One preferred, but not exclusive, method is to electroless plate a ductile material such as copper onto the entire impeller surface.

Electroless deposition is a process for depositing conductive materials over a catalytically active surface by chemical reduction in the absence of an external electric current. Typical metals that are deposited by electroless deposition include copper and nickel and can include such metals as gold, palladium, cobalt and tin-lead alloys. Electroless deposition is a selective deposition and occurs at those locations where a catalytic material already exists. For instance, the electroless deposition of copper can occur at locations having exposed copper, gold, silver, or platinum. Also, iron, cobalt, nickel, palladium, or rhodium surfaces can be used to promote electroless deposition of copper thereon. The electroless process is self-perpetuating to the extent of the availability of the electroless deposition solution and other reactive conditions. The electroless deposition herein is discussed in context of a copper deposition, but the invention applies to a variety of materials that can be deposited from electroless solutions. Descriptions of the electroless deposition process can be found in Chapter 31 of Modern Electroplating, F. Lowenheim, (3d ed.) and in U.S. Pat. No. 5,891,513 the disclosures of which are incorporated herein by reference.

For electroless deposition of copper, one chemistry known in the art includes a copper source, a supply of hydroxide ions to adjust the pH, an acid as a reducing agent, and a surfactant as a wetting agent. Furthermore, because copper tends to precipitate above a pH of 3.5, the solution can include an acid, as a complexing agent, to maintain the copper in solution, and a stabilizer. One exemplary solution includes 0.015 mol/liter to about 0.08 mol/liter of copper sulfate, 0.04 mol/liter to about 0.2 mol/liter of ethylenediamninetetraacetic acid (EDTA) as a complexing agent, 0.45 mol/liter to about 0.6 mol/liter of quaternary ammonium hydroxides, such as tetramethylammonium hydroxide (TMAH), or potassium hydroxide (KOH) to supply the OH- to achieve a pH preferably above about 11, 0.06 mol/liter to about 1.0 mol/liter of formaldehyde (HCHO) or glyoxylic acid as the reducing agent, and 1 gm/liter to about 6 gm/liter of nonyl-phenol-ethoxilated phosphate ester (CAS 68412-53-3), known as RHODAFAC RE 610 as the surfactant. The electroless deposition process is a heated process that either heats the electroless deposition fluid or the substrate and preferably both to a temperature between about 15° C. to about 100° C., preferably between about 50° C. to about 70° C., and most preferably about 60° C. A typical chemical reaction among the principal components can be expressed as:

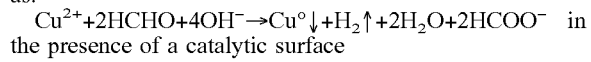
in the presence of a catalytic surface

The reaction thus delivers two electrons to the copper which allows the copper to deposit on the catalytic surface and hydrogen gas is produced as a byproduct. The components of the solution can be mixed in deionized water. After deposition, the surface of the substrate can be rinsed with deionized water to remove the remaining electroless deposition solution. In tests, the electroless deposition solution deposits material at a rate of about 400 Å per minute and, therefore, a 100 Å seed layer would be created in about 15 seconds for a subsequent deposition process such as electroplating.

To provide hardness and chemical resistance, it is preferable to follow the electroless copper plating with an electrolytic plating of nickel, cadmium, or chrome. Unlike electroless plating, an electrical current is required for metal deposition. Electroplating allows for metal deposition on any metal surface in a solution provided an electrical current is passed through the solution.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for manufacturing an impeller blade, comprising:
   modeling a desired shape of the impeller blade using computer aided design (CAD);
   fabricating the desired shape of the impeller blade using a solid free form manufacturing (SSF) technique; and
   metal-plating the exterior surface.

2. The method according to claim 1, wherein the impeller blade has an interior space and an exterior surface.

3. The method according to claim 2, further comprising the step of inserting a skeletal support structure into the interior space.

4. The method according to claim 2, wherein said step of metal-plating comprises electrolessly plating the exterior surface.

5. The method according to claim 4, wherein the step of metal-plating further comprises of electrolytically plating the exterior surface.

6. The method according to claim 4, wherein the exterior surface is electrolessly plated with copper.

7. The method according to claim 5, wherein the exterior surface is electrolytically plated with nickel.

8. The method according to claim 1, wherein said step of fabricating comprises:
   fabricating a first impeller segment having an exterior surface, using computer aided design (CAD); and
   fabricating a second impeller segment having an exterior surface, using computer aided design (CAD).

9. The method according to claim 8, further comprising:
   mating the first impeller segment onto a rigid skeleton;
   mating the second impeller segment onto the rigid skeleton; and
   fastening the first impeller segment and the second impeller half to each other.

10. The method according to claim 9, wherein said step of fastening is chemical bonding.

11. The method according to claim 9, wherein said step of fastening is mechanical fastening.

12. The method according to claim 3, wherein the skeletal support structure is metal.

13. The method according to claim 12, wherein the skeletal support structure comprises a plurality of metal rods and a hub having a proximal end and a distal end, wherein the metal rods extend axially from proximal end to the distal end.

14. The method according to claim 1, wherein the solid free form manufacturing (SSF) technique is three dimensional printing (3DP).

15. The method according to claim 1, wherein the solid free form manufacturing (SSF) technique is stereo-lithography (SLA).

16. The method according to claim 1, wherein the solid free form manufacturing (SSF) technique is selective laser sintering (SLS).

17. The method according to claim 1, wherein the solid free form manufacturing (SSF) technique is ballistic particle manufacturing (BPM).

18. The method according to claim 1, wherein the solid free form manufacturing (SSF) technique is fusion deposition modeling (FDM).

19. An impeller, comprising:
   means for modeling a desired shape of the impeller blade having an interior space and an exterior surface, using computer aided design (CAD);
   means for fabricating the desired shape of the impeller blade using a solid free form manufacturing (SSF) technique;
   means for metal-plating the exterior surface; and
   a skeletal support means disposed within the interior space.

20. The impeller according to claim 19, further comprising a means for electrolessly plating the exterior surface with copper.

21. The impeller according to claim 19, further comprising a means for electrolytically plating the exterior surface with nickel.

* * * * *